Patented June 9, 1936

2,043,574

UNITED STATES PATENT OFFICE 2,043,574

PROCESS FOR TREATING METALS

Jesse O. Betterton and Albert J. Phillips, Metuchen, N. J., assignors to American Smelting and Refining Company, New York, N. Y., a corporation of New Jersey No Drawing. Application July 19, 1934,
Serial No. 736,042

16 Claims. (Cl. 75—78)

The present invention relates to the treatment of metals or alloys containing tin and provides a process whereby tin may be readily separated, in a highly efficient manner, and recovered from tin-bearing alloys of lead, antimony, bismuth, and the like, for example, various type metal compositions, tin-bearing antimonial leads, solders, etc., and the reclaimed scrap from such products.

A general object of the present invention is to provide a process wherein the detinning is effected by reacting upon the metal containing the tin by means of a slag, containing a reactant for the tin, whereby the tin enters the slag, which is separated from the residual metal bath and treated, in a suitable manner, for the recovery of the tin therein.

A further object of the invention is to provide such a reactant slag as above indicated, which is readily fusible and enables the detinning to proceed at temperatures sufficiently low for convenient manipulation of the operation, and also which prevents excessive corrosion and destruction of the apparatus in which the operations are performed.

Other objects of the invention will appear hereinafter, the novel features and combinations being set forth in the appended claims.

In accordance with the present invention, the tin-bearing metal, for example, tin-lead, or tin-antimonial lead, or other tin-bearing alloy, as hereinbefore indicated, is treated in the molten state with an oxidizing agent in the presence of a carrier slag comprising principally calcium chloride. As a result, the tin is converted by interaction with the oxidizing agent and calcium chloride into stannic oxide and concentrated in a slag substantially free from such elements as arsenic, antimony, copper, bismuth, selenium, tellurium and precious metals which may be present in the original metal. The slag is treated for recovering the tin content thereof, in any suitable manner, which desirably includes a lixiviation of the slag with water to dissolve water-soluble components of the slag, the insoluble residue being smelted with coke to yield a metal of high tin content, or otherwise processed for the recovery of tin.

Employing standard apparatus, the invention may be practiced as follows:

The tin-bearing metal or alloy is melted in a cast iron kettle and preferably drossed in order to insure a clean surface to which is added the calcium chloride preferably mixed with other materials suitable for lowering the melting point of the calcium chloride. This material which conveniently may be sodium chloride is mixed with the calcium chloride in substantially eutectic proportions in order to avoid the necessity of using excessively high temperatures; thus a mixture of approximately 67% CaCl$_2$—33% NaCl is found to be a convenient slag-forming composition. Materials other than sodium chloride will readily suggest themselves, the choice of materials depending somewhat on the composition and nature of the metal being detinned, this in turn determining the temperature range at which the process is to be operated. The metal is heated to a proper temperature, and a mixing machine such as is ordinarily employed in lead refining operations is installed in the bath. The oxidizing agent, such as lead oxide, niter, etc., is added to the molten bath. If the mixing machine is of the variety which produces a vortex in the bath, the oxidizing agent is appropriately added to the vortex as the mixing operation progresses.

As a result of the foregoing treatment, that is, the oxidation (by air, oxidizing gases or solid or liquid oxidizing agents) of the metal in the presence of calcium chloride, the tin is selectively extracted from the metal and concentrated in the slag. The slag is then removed, and the calcium chloride oxidation treatment is repeated if necessary until the metal is substantially free from tin. The tin slag is treated for the recovery of the tin by any suitable procedure.

In accordance with the above-outlined procedure, the requisite amount of slag was melted down and to it was added a calculated amount of compounded lead alloy containing approximately 5% tin and 10% antimony, adding to this charge the desired amount of litharge in one pound additions, thirty minutes apart, the stirrer being set in the kettle to create a definite vortex. At the end of the tests the slag was usually sampled with a cold rod, then ladled out. An original sample was then taken of the metal and it was likewise ladled out.

The following examples will serve to illustrate the efficiency of the present process in separating tin from tin-bearing metals or alloys:

*Example I*

A mixture of 10 parts by weight of calcium chloride and sodium chloride in the proportions of substantially 67% CaCl$_2$ and 33% NaCl, thereby forming substantially a eutectic mixture, was added to a molten bath of 70.8 parts by weight of metal analyzing 4.7% Sn, 7.2% Sb and 87.0% Pb.

To this bath and slag were added 13 parts by weight of litharge analyzing 92.8% Pb, the addition of the litharge being at the rate of 2 parts by weight per hour at a bath temperature of 550° C. The entire charge was mixed for approximately two hours at 550° C. At the end of this period the slag analyzed 18.6% Sn, 1.7% Sb, 17.0% Pb, while the metal bath analyzed only a trace of Sn, 6.9% Sb and 93.1% Pb.

Upon separating the slag from the metal bath, 73.6 parts by weight of the latter were recovered, detinned to a mere trace of tin, as above indicated. There were also recovered 16.4 parts by weight of slag of the above-indicated analysis.

Example II

A mixture of 10 parts by weight of calcium chloride and sodium chloride in the proportions of substantially 67% $CaCl_2$ and 33% NaCl, thereby forming substantially a eutectic mixture, was added to a bath of 70 parts by weight of metal analyzing 89.7% Pb, 4.9% Sn and 5.4% Sb. To this molten charge were added 13 parts by weight of litharge, analyzing 92.8% Pb, the addition being made over a period of six hours. The entire charge was mixed through a period of about 5 hours at a temperature of 550° C., the mixing being interrupted at hourly intervals for obtaining samples of slag for analysis. The slag was quite fluid by the expiration of the first hour of mixing.

At the end of five hours of mixing, an analysis of the slag showed it to contain 11.6% Pb, 19.22% Sn, 0.85% Sb, and 0.8% Fe. The slag was separated from the metal bath and granulated into water, there being recovered 75.2 parts by weight of metal analyzing 95.6% Pb, 3.4% Sb, with only traces of tin.

After granulation of the slag into water, there were recovered 1.8 parts by weight of metal prill analyzing 95.6% Pb, 3.4% Sb, and only traces of Sn; and 4.9 parts by weight of insoluble slag, analyzing 21% Pb, 49.5% Sn, 1.67% Sb, and 3.4% Fe.

The insoluble portion of the slag is processed by any desired operation for the recovery of the tin content.

Example III

A mixture of 10 parts by weight of calcium chloride and sodium chloride in the proportions of substantially 67% $CaCl_2$ and 33% NaCl, thereby forming substantially a eutectic mixture, was added to a bath of 68.6 parts by weight of metal analyzing 5.6% Sn, 9.65% Sb, and 84.75% Pb. To this bath and slag were added, through a period of two hours, 13 parts by weight of litharge, analyzing 92.8% Pb. The entire charge was mixed for two hours at 550° C. and the slag was separated from the metal. The latter analyzed 0.7% Sn, 8.15% Sb and 91.15% Pb, there being recovered 73.1 parts by weight of metal. The slag analyzed 19.0% Sn, 1.3% Sb, 0.2% Fe, and 19.3% Pb, there being recovered 14.6 parts by weight of the slag.

The above example was chosen for a test run for the reduction of the antimony content of the slag preparatory to the recovery of the tin and lead values thereof. For this purpose, it was evident that there be chosen a reactant which would effect an interaction with the antimony oxide in the slag to displace the antimony therefrom and carry the displaced antimony out of the slag, preferably into a bath beneath the slag; this reactant would be one which would be less active than tin, in view of the fact that it is desired to retain the major portion of the tin in the slag for ready recovery of the tin. The reactants suitable for this purpose are lead and bismuth, lead being chosen for reasons of greater convenience and less cost, and also as being more suitable in view of the composition of the slag; and it was found that the use of refined metallic lead does not cause appreciable tin losses and does lower the antimony content of the slag to a remarkable degree.

To the slag from Example III above were added 70 parts by weight of refined metallic lead which was mixed with the slag for three and one-half hours at 550° C. At the end of this time a sample of the metal bath was taken and analyzed and found to be 99.65% Pb, 0.35% Sb, and a trace of tin. The slag analyzed 19.5% Sn, 0.25% Sb, 13.0% Pb, and 0.5% Fe.

It is seen, therefore, that the tin-antimony ratio was reduced from 14.6:1 to 78:1.

In a still further run, a slag obtained from a detinning treatment in which lead chloride and lead oxide were employed was treated in accordance with the above-indicated procedure. Into 30 parts by weight of such slag analyzing 45% Pb, 17.7% Sn, and 3.4% Sb, were mixed 50 parts by weight of refined lead, the charge being stirred for approximately two hours at approximately 550° C. At the expiration of two hours, the slag (30.75 parts by weight) analyzed 49.0% Pb, 15.8% Sn, and 1.9% Sb, giving a tin-antimony ratio of 8.1:1 as against a ratio of 5.2:1 in the original slag.

The above illustrations show that an effective detinning of the original metal was obtained in each instance, the tin extracted from the metal being concentrated in the slag, together with a rather substantial amount of the antimony from the metal, this latter being very substantially removable from the slag by stirring the slag over refined lead. The detinning is accomplishable by the present process very expeditiously and cheaply and with simple mechanical manipulations. A substantially eutectic mixture of calcium chloride and flux is preferred, as the operations can be carried out thereby at temperatures not excessively high thereby avoiding excessive damage to the apparatus employed. Alkali halides, singly or mixtures thereof, depending upon operating conditions are convenient and suitable fluxing materials, though obviously other fluxes may be employed.

From the foregoing description and illustrations, it will be readily apparent to those skilled in the art that the present invention provides an efficient commercial process for separating and recovering tin from tin-bearing metals and alloys. By it the tin is concentrated at a very low cost in a slag which is readily processed to yield a tin residue readily convertible into marketable tin products.

It will be understood that in addition to calcium chloride, so far as concerns the general process, other alkaline salts may be employed such, for example, as calcium fluoride, or barium chloride or fluoride, or sodium or potassium chloride, fluoride, etc., the proportions of the slag-forming materials being modified as may be required depending upon the melting points of the reactant salts; further, mixtures of such salts may be employed if operation conditions render the use of such to be desirable, nor is the invention limited necessarily to halide salts. The term "alkaline" as used herein is intended to include both alkali and alkaline earth salts.

It will be understood, therefore, that while certain novel features of the invention have been disclosed and are pointed out in the annexed claims, various omissions, substitutions, and changes may be made by those skilled in the art without departing from the spirit of the invention, and it is intended and desired to embrace within the scope of the invention such modifications and changes as may be necessary to adapt it to varying conditions and uses.

What is claimed is:

1. The process of detinning tin-containing metals which comprises concentrating the tin content thereof in an alkaline carrier slag containing an oxidizing agent for the tin, said carrier slag being inert with respect to the tin oxide resulting from the reaction of the oxidizing agent upon the tin.

2. The process of detinning tin-containing metals which comprises melting the metals and contacting the resulting molten bath with a carrier slag containing an alkaline halide and an oxidizing agent while allowing the tin in the bath to concentrate in the slag, said carrier slag being inert with respect to the tin oxide resulting from the reaction of the oxidizing agent upon the tin.

3. The process of detinning tin-containing metals which comprises contacting a bath of the metals with a carrier slag containing an alkaline halide, a flux adapted to lower the melting point of the halide, and an oxidizing agent for the tin.

4. The process of detinning tin-containing metals which comprises contacting a bath of the metals with a slag containing an alkaline halide, a flux adapted to lower the melting point of the halide, and an oxidizing agent for the tin, the halide and flux being present in amounts forming substantially a eutectic mixture.

5. The process of detinning tin-containing metals which comprises melting the metals in the presence of a slag containing calcium chloride and litharge, and contacting the metals and slag to allow the litharge to act on the metals for concentrating the tin in the slag.

6. The process of detinning tin-containing metals which comprises melting the metals in the presence of a slag containing calcium chloride, sodium chloride and litharge, and contacting the metals and slag under conditions enabling the litharge to act on the metals to concentrate the tin in the slag.

7. The process of detinning tin-contacting metals which comprises melting the metals in the presence of a slag containing calcium chloride and sodium chloride in substantially eutectic proportions, and litharge, and contacting the metals and slag under conditions enabling the litharge to act on the metals to concentrate the tin in the slag.

8. The process of detinning tin-containing metals which comprises forming a reactant charge by melting the metals in the presence of a slag containing calcium chloride and sodium chloride, and contacting the metals and slag while adding litharge to the charge, thereby concentrating the tin content of the metals into the slag.

9. The process of detinning tin-containing metals which comprises forming a reactant charge by melting the metals in the presence of a slag containing substantially a eutectic mixture of calcium chloride and sodium chloride and adding litharge to the charge in quantities sufficient to substantially completely oxidize the tin, thereby concentrating the tin content of the metals into the slag.

10. The process of treating metals containing tin and antimony, which comprises contacting a bath of the metal with a slag containing a reactant for transposing the tin and antimony from the metal into the slag, thereby concentrating tin and antimony into the slag, separating the slag from the residual metal, and substantially separating the tin and antimony by reacting upon the slag with metallic lead to remove the antimony from the slag preferentially to the tin.

11. The process of treating materials containing tin and antimony, which comprises forming a charge of the materials, concentrating the tin and antimony into a portion of the charge by oxidation in the presence of an alkaline carrier slag which is inert with respect to the resulting oxides, and reacting upon the concentrated portion with lead to preferentially abstract the antimony from the concentrated portion of the charge.

12. The process for treating lead containing tin which comprises reacting a molten bath of such metal with litharge thereby converting the tin to oxide and concentrating said oxide in a slag which is chemically inert with respect to the tin oxide.

13. The process according to claim 12 in which the carrier slag comprises calcium chloride.

14. The process for detinning a bath of metal which comprises subjecting same to oxidation in the presence of a substantially water-soluble carrier slag containing calcium chloride as its major constituent and which is inert with respect to tin oxide thereby concentrating the tin as oxide in said slag.

15. The process for extracting and recovering tin from tin-bearing metal which comprises converting the tin content thereof to oxide in the presence of a slag adapted to retain the tin therein as oxide, lixiviating the slag and smelting the residue to metal.

16. The process for treating tin-bearing metal which comprises oxidizing the tin in a molten bath of such metal to tin oxide in the presence of a substantially water-soluble carrier slag which is chemically inert with respect to the tin oxide thereby concentrating the tin therein and thereafter separating the water-soluble components of the slag from the tin oxide.

JESSE O. BETTERTON.
ALBERT J. PHILLIPS.